United States Patent
Tsuboi et al.

(10) Patent No.: US 6,886,983 B2
(45) Date of Patent: May 3, 2005

(54) LINEAR MOTION GUIDE UNIT WITH MEANS FOR KEEPING CAGE AGAINST WANDERING

(75) Inventors: Takaaki Tsuboi, Kanagawa-Ken (JP); Kishinori Shibamoto, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 29 days.

(21) Appl. No.: 10/179,291

(22) Filed: Jun. 26, 2002

(65) Prior Publication Data

US 2003/0016890 A1 Jan. 23, 2003

(30) Foreign Application Priority Data

Jul. 17, 2001 (JP) .......................................... 2001-216235

(51) Int. Cl.[7] .............................................. F16C 29/04
(52) U.S. Cl. .......................................... 384/51; 384/47
(58) Field of Search .............................. 384/51, 57, 47, 384/48, 49, 50; 74/465, 109, 110, 29, 462, 132, 422, 431

(56) References Cited

U.S. PATENT DOCUMENTS

| | | | | |
|---|---|---|---|---|
| 2,294,665 A | * | 9/1942 | Jackson | 384/47 |
| 4,149,431 A | * | 4/1979 | Rouverol | 74/462 |
| 5,076,715 A | * | 12/1991 | Saoyama et al. | 384/49 |
| 5,116,141 A | * | 5/1992 | Chitayat | 384/17 |
| 5,427,454 A | * | 6/1995 | Tsuboi | 384/47 |
| 5,607,238 A | * | 3/1997 | Sherman | 384/49 |
| 6,065,874 A | * | 5/2000 | Tour | 384/57 |
| 6,276,830 B1 | * | 8/2001 | Edelmann et al. | 384/51 |

FOREIGN PATENT DOCUMENTS

| | | |
|---|---|---|
| JP | 108056/1999 | 4/1999 |
| JP | 315831/1999 | 11/1999 |
| JP | 315832/1999 | 11/1999 |

* cited by examiner

Primary Examiner—William C. Joyce
Assistant Examiner—Julie K. Smith
(74) Attorney, Agent, or Firm—Browdy and Neimark, P.L.L.C.

(57) ABSTRACT

A linear motion guide unit is disclosed in which a rack-and-pinion arrangement is interposed between paired guide rails to keep a cage retaining more than one rolling element therein against falling off from the guide rails. In the linear motion guide unit, the cage arranged between confronting raceway grooves of the guide rails hold therein a pinion, which comes in mating with a rack lying in the raceway grooves. The cage is made therein with an aperture in which a thick portion of a pinion holder fits to secure the pinion holder to the cage. The pinion is comprised of a disc having teeth that come in mating with the rack, and a shaft serving as an axis about which the disc rotates. The pinion is held in the pinion holder, with the shaft being carried for rotation in pinion chamber in the pinion holder.

12 Claims, 9 Drawing Sheets

LINEAR MOTION GUIDE UNIT WITH MEANS FOR KEEPING CAGE AGAINST WANDERING

BACKGROUND OF THE INVENTION

1. Field of the Invention

The present invention relates generally to a linear motion guide unit adapted for use in various types of machinery such as semiconductor manufacturing machines, precision measuring instruments, precision inspection equipment, precision assembly machines, machine tools, industrial robots or the like and, more particularly, to a linear motion guide unit that is provided therein with means for keeping a cage against wandering.

2. Description of the Prior Art

Current linear motion guide units of the type where rolling elements are allowed to roll over only a definite travel instead of rolling through a recirculating circuit have been used extensively in diverse fields of machinery such as semiconductor manufacturing machines to guide a part in a linear way relatively to any counterpart. To this end, the linear motion guide units of the sort recited just above are seeing growing demands for high speed operation and high acceleration/deceleration, with even made slim or compact in construction. At the same time the advanced machinery expects the linear motion guide units to be operated with high precision and low-frictional resistance. Solving the issues stated earlier is needed for further development of the linear motion guide units.

Disclosed in Japanese Patent Laid-Open No. 108056/1999 is a linear motion guide unit of the type recited earlier, which has a means for keeping a cage or retainer against wandering to help control certainly the travel of guide rail members. The cylindrical rollers held in the cage are placed for rolling between confronting raceway grooves formed on the guide rail members. The cage has supported a pinion for rotation, which comes in mesh with a rack of gear teeth held in a gutter for relief. With the linear motion guide unit recited earlier, the teeth on the rack are made recessed to avoid any interference with the cylindrical rollers. This construction allows the rack of gear teeth to be made in a module large in size, thus increasing the strength in mesh with the pinion thereby to keep the cage against wandering with respect to the associated guide rail members. The prior construction, as having no need of making the gutter for relief large, also can ensure the wider guide surface.

In Japanese Patent Laid-Open No. 315831/1999 there is disclosed a linear motion guide system with a cage that can be positively guided so as to move with no wander. The prior linear motion guide unit has two guide rails arranged in opposition for lengthwise movement relatively to one another, and rolling elements held in a cage with being interposed between the confronting guide raceways on the guide rails. The cage is provided with at least one pinion to lead positively the cage. The gear wheel comes in mesh with racks of teeth gear, which are arranged to the guide rails, one to each rail.

The same sort of linear motion guide system is also disclosed in Japanese Patent Laid-Open No. 315832/1999.

In every prior linear motion guide systems recited earlier, nevertheless, the pinion or gear wheel is supported for rotation by a pair of gear holders that are in turn made into engagement with latch pawls of the cage. The construction, despite involving more sophisticated chores for assembly of the gear holder, couldn't make regularly certain of secure engagement of the gear holder. Moreover, the prior linear motion guide units of the sorts stated earlier, as the rack and the pinion are made relatively complicated in their tooth profile, are apt to encounter large sliding resistance and also very tough to shrink the guide unit itself in construction.

With the rack-and-pinion arrangement used in the conventional linear motion guide units, the pinion has a circular plate around which rolling elements are positioned at regular intervals, with extending somewhat radially outwardly beyond the outermost periphery of the circular plate. The rack is made with recesses that are arranged at regular intervals parallel with the radially extending rolling elements. This rack-and pinion arrangement stated just earlier involves a chore to make a series of recesses on the rack in line with the teeth of the pinion and also needs sophisticated machining and forming operations to make sure of accurate mating between the associated teeth of the rack and the pinion.

SUMMARY OF THE INVENTION

The present invention, therefore, has as its primary object to overcome the major problems discussed earlier in the linear motion guide units of the sort that rolling elements are allowed to roll over only a definite travel instead of rolling through a recirculating circuit, and in particular to provide a linear motion guide unit with a means for keeping a cage against any wandering, which can easily fit in the conventional linear motion guide unit of standard design with only some modification of the linear motion guide unit itself. The linear motion guide unit with means for keeping a cage against wander according to the present invention can be adapted to machinery such as semiconductor producing machines, precision machines, and so on to make certain of accurate linear travel of a moving body such as a table, and so on, which is made in a wide range of sizes, from very small instruments to very large machines. Moreover, the present linear motion guide unit with the means for keeping the cage against wander may serve functional characteristics for high speed operation and high acceleration/deceleration of the moving body, low sliding resistance, and so on, with even helping make the moving body itself slim or compact in construction.

The present invention is concerned with a linear motion guide unit with a means for keeping a cage against wandering, comprising; a pair of guide rails that are arranged movable relatively to one another and have confronting raceway grooves on their lengthwise sides, one to each side, a cage of rectangular sheet lying in a raceway defined between the raceway grooves on the guide rails, with retaining therein more than one rolling element, racks lying in the raceway grooves, one to each raceway groove, in opposition to one another, and a pinion having teeth mating with the opposing racks and installed in the cage for rotation; wherein the cage has therein an aperture in which a pinion holder fits, and the pinion is accommodated for rotation in a pinion chamber defined in the pinion holder.

In one aspect of the present invention, a linear motion guide unit with means for keeping a cage against wandering is provided in which the pinion is comprised of a disc having the teeth that are positioned circumferentially at regular intervals around the disc to form tooth spaces each separating any two adjacent teeth, and a shaft carried in the pinion chamber for rotation to provide an axis about which the disc rotates. Moreover, the teeth formed around the disc are each made up of a dedendum part extending radially outwardly out of a curved periphery of the disc, and an addendum part integral with the dedendum part and made in a semicircular configuration. That is to say, the whole depth of the tooth around the pinion is made up of a proximal part for dedendum and a distal part for addendum.

In another aspect of the present invention, a linear motion guide unit with means for keeping a cage against wandering is provided in which the pinion holder has a thick portion raised above any one side thereof so as to fit in the aperture in the cage, thereby providing the holder chamber, and a flange portion surrounding the thick portion so as to come in abutment against any flank of the cage to join the pinion holder to the cage. In the pinion chamber defined in the raised thick portion of the pinion holder, moreover, there are provided a bearing area to carry the shaft of the pinion for rotation, and a pinion area where the pinion is accommodated with the teeth thereof being allowed to mesh with the teeth on the rack.

In another aspect of the present invention, a linear motion guide unit with means for keeping a cage against wandering is provided in which the rack lies in a gutter cut in the raceway groove in a longitudinal direction thereof. Moreover, the rack is made with a series of tooth spaces that are arranged in the longitudinal direction of the rack at the same pitch as a circular tooth pitch of the teeth around the pinion, while the tooth spaces are each designed to have a circular configuration somewhat larger in radius than the semicircular configuration of the addendum of the pinion tooth, thereby making certain of sequential mating with the pinion tooth. According to a further another aspect of the present invention, the tooth on the rack separating any two adjacent tooth spaces to come in mating with the tooth around the pinion has an addendum part where a top land is made into a flat top somewhat higher than a radius of semicircular tooth space, without terminating in any tapered tip.

In another aspect of the present invention, a linear motion guide unit with means for keeping a cage against wandering is provided in which the teeth on the rack separating any two adjacent tooth spaces to come in mating with the teeth around the pinion are made with recesses lest they come in contact with the rolling elements arranged in the raceway grooves. In a further another aspect of the present invention, the racks are prepared either apart from the guide rails having the raceway grooves in which the racks lie or integrally with the guide rails. Moreover, there is disclosed the integral construction of the guide rail with the rack made of a powder of metal, which is formed with an injection molding, followed by being subjected to sintering.

In another aspect of the present invention, a linear motion guide unit with means for keeping a cage against wandering is provided in which the raceway grooves are each made up of a pair of raceway surfaces with which the rolling elements of cylindrical roller come in rolling contact, and a gutter sunk between the raceway surfaces, in which the rack lies. In a further another aspect of the present invention, there is disclosed a linear motion guide unit with means for keeping a cage against wandering, in which the cylindrical rollers are held in the cage such that they lie in the raceway grooves with their own axes intersecting alternately one another at right angle. Moreover, a linear motion guide unit with means for keeping a cage against wandering is provided in which the guide rails are each provided with a stopper to keep the cage from escape out of the associated guide rail. In another aspect of the present invention, there is disclosed a linear motion guide unit with means for keeping a cage against wandering, in which the guide rails are provided with fastening means to secure any one of a moving part such as a table or the like and a stationary part such as a bed or the like.

With the linear motion guide unit constructed as stated earlier, the pinion holder is certainly secured to the cage while the pinion is allowed to fit in the cage with ease. The teeth on the rack and the pinion are shaped to a specific tooth profile that is less subject to binding and effective to render the teeth high in stiffness. Moreover, the rack integral with the guide rail may be made of a powder of metal, which is formed with an injection molding, followed by being subjected to sintering.

Accordingly, the present invention provides the rack-and-pinion system serving as the means for keeping the cage against any wandering, which may be set easily with accuracy in the linear motion guide unit by only close-fit of the pinion in the aperture in the cage, without forcing much modification on the construction of any conventional linear motion guide units used in the machinery such as semiconductor manufacturing machines, precision machines, and so on. The linear motion guide unit with the means for keeping the cage against wandering according to the present invention is preferable for the small machines, and also helps make certain of the accurate travel of the moving part such as a table mounted on any guide rail, meeting demands for high speed operation and high acceleration/deceleration of the moving part or the table, with even made slim or compact in construction. At the same time the present invention helps serve useful functions such as low-frictional sliding resistance, and so on anticipated for linear motion guide unit of the sort that rolling elements are allowed to roll over only a definite travel instead of rolling through a recirculating circuit.

DETAILED DESCRIPTION OF THE PREFERRED EMBODIMENTS

Referring now in detail to the drawings, there is shown a linear motion guide unit with a means for keeping a cage against wandering according to the present invention. The linear motion guide unit discussed later is of the type where rolling elements are allowed to roll over only a definite travel instead of rolling through a recirculating circuit, while the means for keeping the cage against wandering is made up of racks and a pinion, which are combined together to provide a rack-and-pinion arrangement. It is to be understood that the means for keeping the cage against any wandering according to the present invention can fit easily in the same linear motion guide unit as disclosed in Japanese Patent Laid-Open No. 108056/1999, which is the senior application filed in the name of the present applicant, without forcing much modification on the original design specifications of the linear motion guide unit. Thus, the linear motion guide unit stated later has the same construction in basic aspects as the guide unit disclosed the publication recited above.

Figure 1:
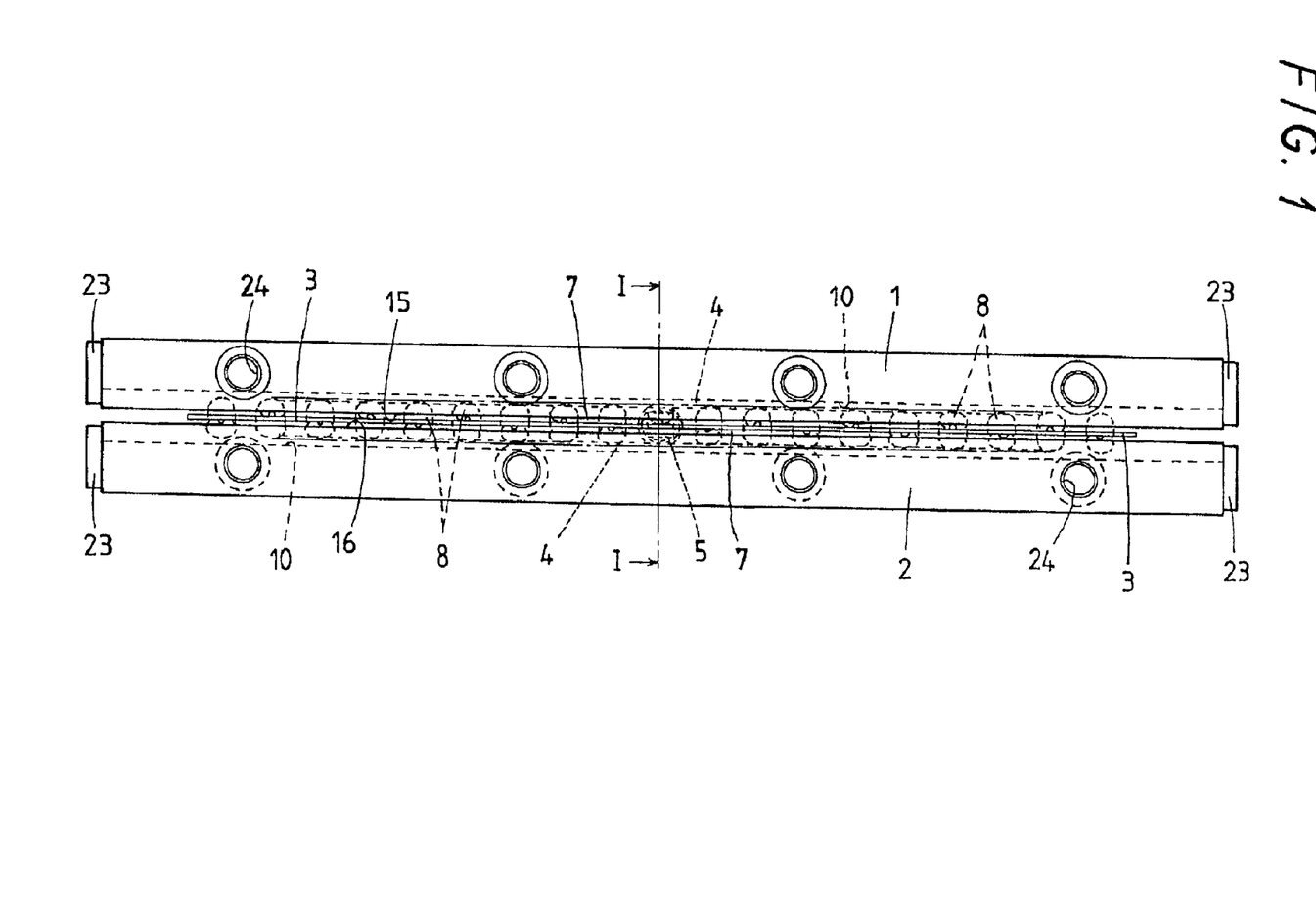
FIG. 1 is a front elevation showing a preferred embodiment of a linear motion guide unit with a means for keeping a cage against wandering according to the present invention.
Figure 2:
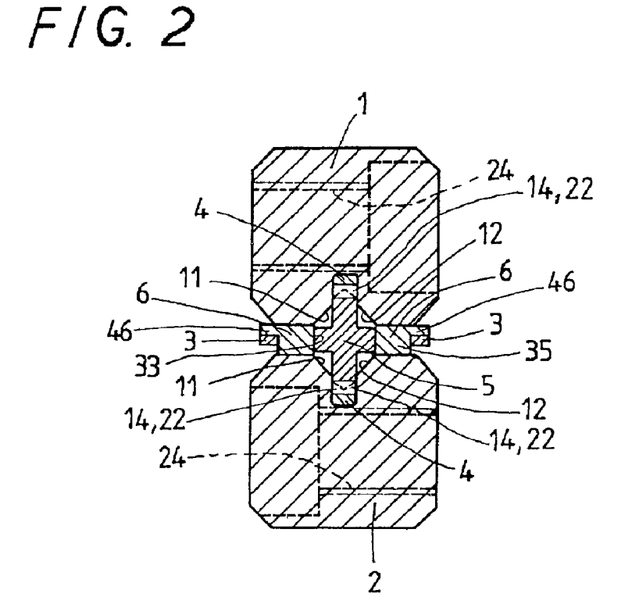
FIG. 2 is an enlarged cross section taken along the plane lying on the line I—I of FIG. 1, where a pinion is placed.
Figure 13:
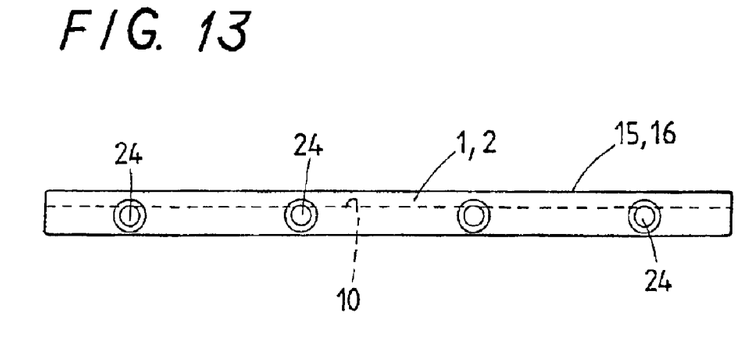
FIG. 13 is a front elevation showing any one of guide rails in the linear motion guide unit of FIG. 1.

An embodiment of the linear motion guide unit according to the present invention, as especially shown in FIGS. 1, 2 and 13, is comprised of at least one pair of elongated guide rails 1, 2 that are allowed to move relatively to one another in their lengthwise direction and provided on their confronting lengthwise surfaces 15, 16 with raceway grooves 10, one to each lengthwise surface, to define a raceway 7 between the confronting raceway grooves 10 on the guide rails, more than one rolling element 8 arranged in the raceway 7, a cage 3 of sheet to hold the rolling element 8 therein, racks 4 lying in gutters 9 for relief cut in the raceway grooves 10, and a pinion 5 installed in the cage 3 for rotation in a way continuing to mate with the radially opposite racks 4.

The raceway groove 10 formed on each of the confronting surfaces 15, 16 of the paired guide rails 1, 2 is made in a V-shape in cross section to form a raceway of rectangular cross section between the confronting surfaces 15, 16. With the raceway constructed as stated just earlier, more than one rolling element 8 of a cylindrical roller can be interposed snugly between the opposing raceway grooves 10 for free rolling along the raceway. Thus, the guide rails 1, 2 are allowed to move with respect to each other along their longitudinal direction by virtue of the rollers 8. Moreover, the guide rails 1, 2 are made with bolt holes 24 such as counterbores, threaded holes, and so on lengthwise at preselected intervals, and combined together in a relation that they are turned around over 180 degrees with respect to each other, so that any one of the guide rails 1, 2 is fastened to the stationary side such as a machine bed, not shown, while another of the guide rails 1, 2 is connected to the moving side such as a table, not shown. According to the linear motion guide unit constructed as stated above, thus, the moving part such as a table, and so on fastened to any one of the guide rails 1, 2 is allowed to travel in linear direction relatively to the stationary part such as a machine bed, and so on bolted to the counterpart of the guide rails 1, 2.

With the linear motion guide unit discussed here, as seen in FIG. 1, the guide rails 1, 2 are each provided at forward and aft ends thereof with threaded holes, one to each end, into each of which fits an end screw 23 having a stopper head to keep the cage 3 from escape out of the associated guide rail 1, 2.

Figure 14:
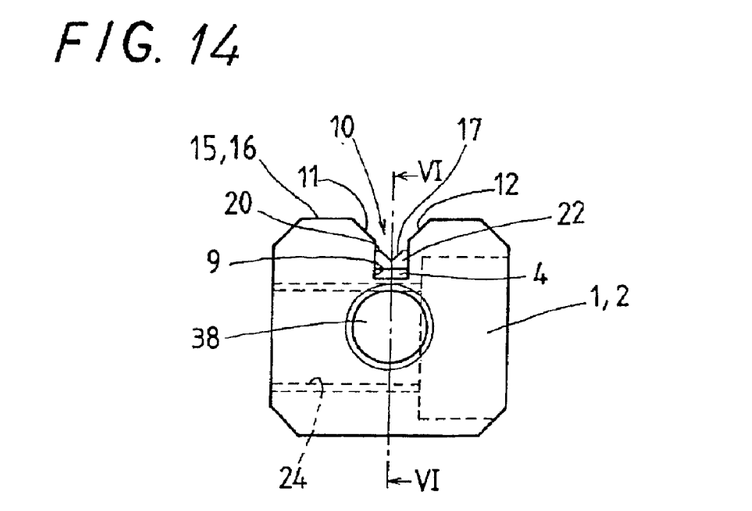
FIG. 14 is an end elevation showing any one of the guide rails, in which a rack is installed of FIG. 13.
Figure 17:
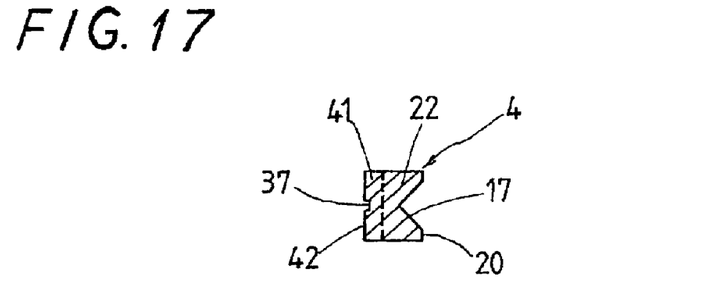
FIG. 17 is showing the rack of FIG. 15, and a cross section of the rack taken along the plane lying on the line VII—VII of FIG. 16.
Figure 18:
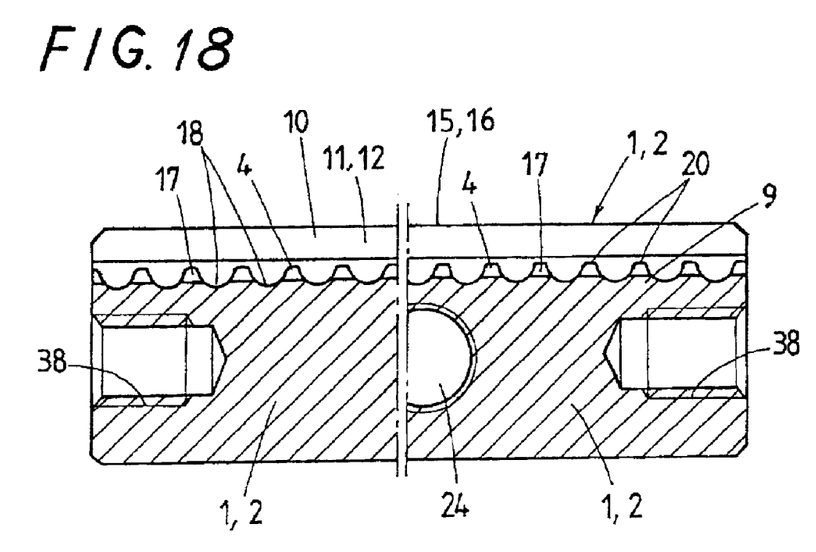
FIG. 18 is a traverse section showing another embodiment of the linear motion guide unit according to the present invention, the view being taken along the plane lying on the line corresponding to the line VI—VI shown in FIG. 14.

Referring to FIGS. 1 to 6, the linear motion guide unit of the present invention mainly has the cage 3 of flat material holding therein more than one rolling element of cylindrical roller 8 arranged in the raceway 7 that is defined between the confronting raceway grooves 10 of the guide rails 1, 2, the racks 4 lying in opposition to one another across the raceway in the gutters 9 for relief formed in the confronting raceway grooves 10, the pinion 5 having teeth 14 mating with the associated racks 4 and supported on the cage 3 for rotation, and a pinion holder 6 fit in an aperture 30 formed in the cage 3 and having a pinion chamber 21 to support and locate the pinion 5 therein for free rotation. Moreover, the racks 4, as shown in FIGS. 14, 17 and 18, lie in the gutters 9 for relief formed in the raceway grooves 10 of the guide rails 1, 2. Each rack 4 has a series of teeth 22 that are partially cut away at their top lands to prepare V-shaped slots so as not to interfere rolling operation of the rolling elements 8.

Referring next to FIGS. 3 to 7, the cage 3 is made of a rectangular sheet extending in the direction along the guide rails 1, 2, which is made with a series of pockets 27 that are arranged at preselected intervals in the longitudinal direction of the cage 3. In the pockets 27 there are provided fingers 26 to retain the rolling elements in the pockets 27, one to each pocket. The cage 3 is also made roughly midway with the aperture 30 in which the pinion holder 6 fits closely. The pinion holder 6 has a thick portion 35 raised above any one side thereof so as to fit in the aperture 30 in the cage 3, thereby providing a pinion chamber 21, and a flange portion 46 surrounding the thick portion 35 so as to come in abutment against any flank 45 of the cage 3 to join the pinion holder 6 to the cage 3. The pinion 5 is carried in the pinion holder 6 for free rotation. The rolling elements 8 held in the cage 3 are cylindrical rollers of square cross section, which are arranged in linear direction with their own axes intersecting alternately one another.

Figure 7:
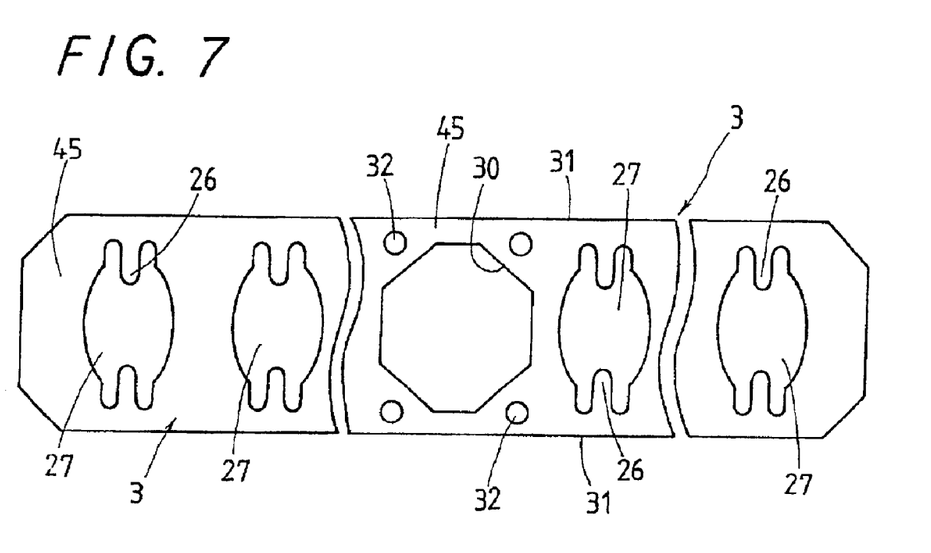
FIG. 7 is a top plan view, partly broken away, showing a cage alone before made up into the cage assembly of FIG. 3.

Especially looking at FIG. 7 in detail, the aperture 30 formed roughly midway of the cage 3 is made larger in size than the pocket 27 in which the cylindrical roller 8 is accommodated. The aperture 30 in the embodiment shown in FIG. 7 is formed in an octagon that is derived by leaving four corners of a quadrilateral having any two opposing sides parallel with lengthwise edges 31 of the cage 3. The cage 3 is moreover made with bolt holes 32 at four corner areas left to provide octagonal aperture 30.

Figure 8:
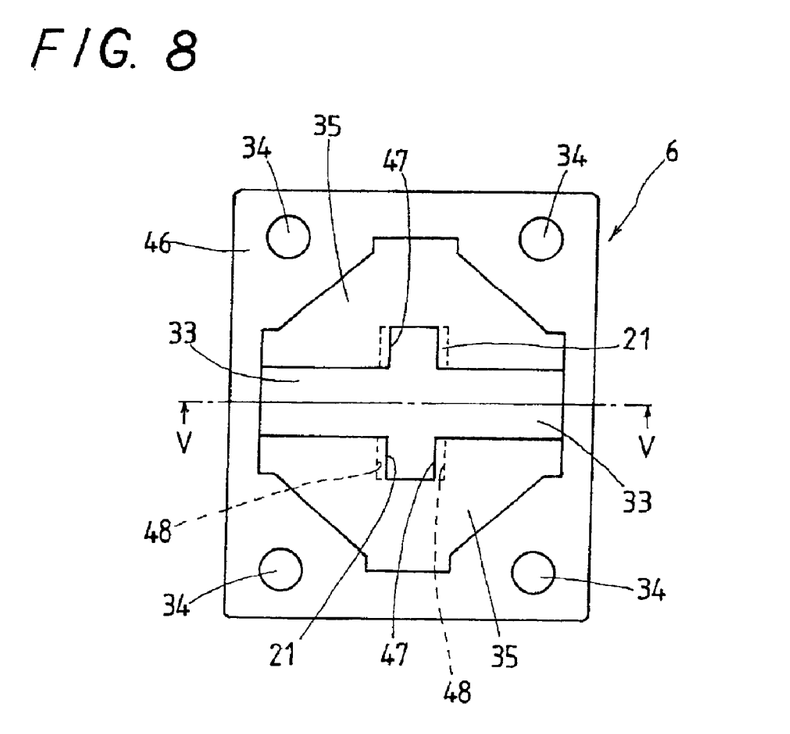
FIG. 8 is an illustration of a pinion holder when viewed from any one side thereof before made up into the cage assembly of FIG. 3.
Figure 9:
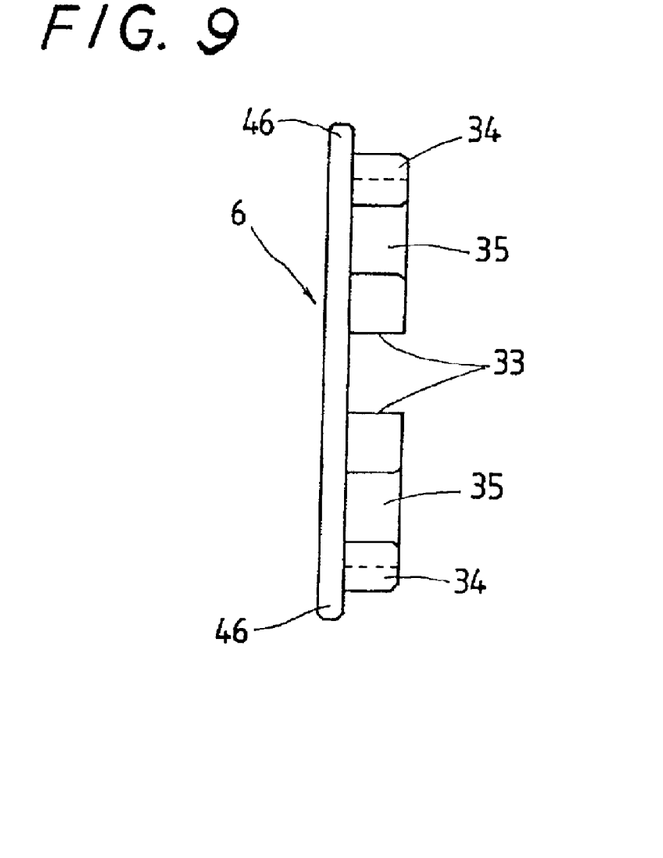
FIG. 9 is a side elevation of the pinion holder shown in FIG. 8.
Figure 10:
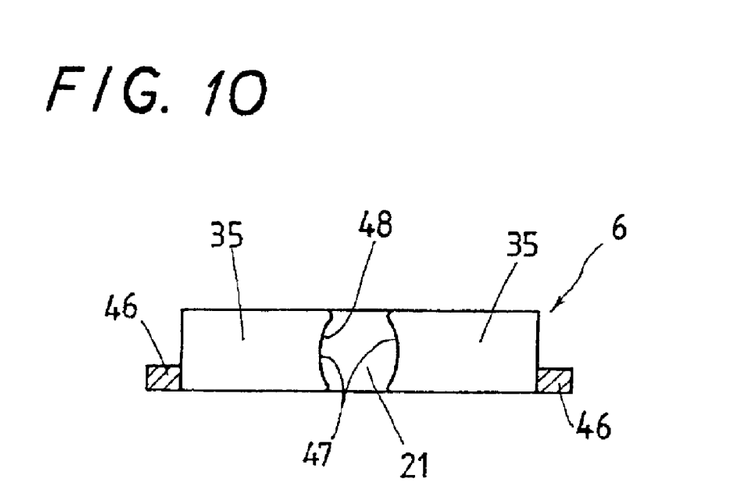
FIG. 10 is a cross section of the pinion holder shown in FIG. 8, the view being taken along the plane lying on the line V—V of that figure.

The pinion holder 6, as shown in FIGS. 8 to 10, is made of a rectangular sheet and has the thick portion 35 of roughly octagonal configuration in plan view, which is raised above any one side, for example the lower side of the rectangular sheet. The thick portion 35 is made recessed at middle area thereof to provide the pinion chamber 21 that includes bearing areas 47 to carry a pinion shaft 36 of the pinion 5 for rotation, and a pinion area 33 of rectangular cross section extending lengthwise of the guide rail, in which the pinion 5 is accommodated with the teeth 14 thereof being allowed to circulate around the pinion shaft 36. The bearing areas 47 lie midway between forward and aft ends of the pinion area 33 on opposite sides thereof and extend perpendicularly to the pinion area 33. That is, the bearing areas 47 in the pinion chamber 21 is formed to define holes of rectangular cross section intersecting the pinion area 33 at right angle, and made curved at 48 in cross section as depicted in FIG. 10 in conformity with the rotation of the pinion shaft 36. At four corner areas of the pinion holder 6 there are provided pins 34 raised above the same side of the pinion holder 6 as the thick portion 35 to fit in holes 32 perforated in the cage 3. Thus, the pinion holder 6 includes the raised thick portion 35 that fits in and conforms to the aperture 30 in the cage 3, and the flange portion 46 extending around the raised portion 35, which is brought into face-to-face contact with any one side 45 of the cage 3 and held in place on the cage 3 with the pins 34 or the like. The raised thick portion 35 is made therein with the pinion chamber 21 where the pinion 5 is carried for rotation.

Figure 11:
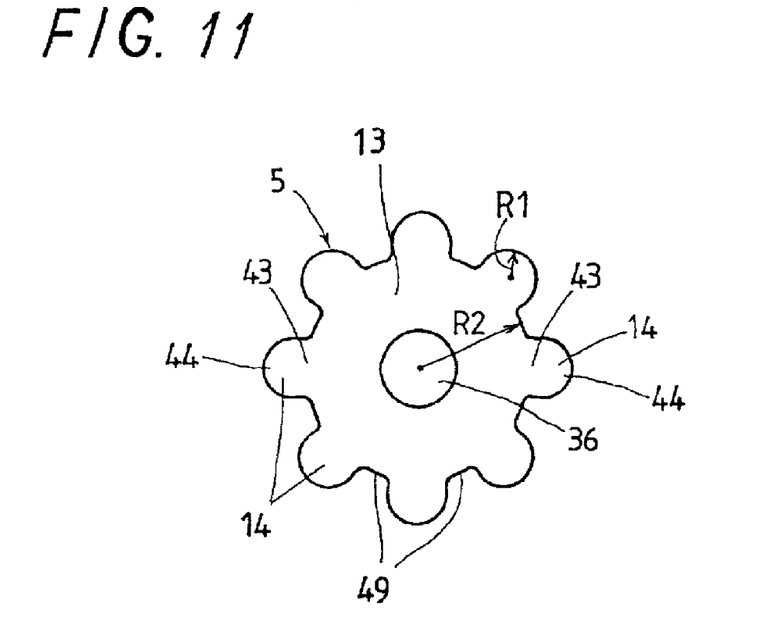
FIG. 11 is a front elevation showing a pinion alone before made up into the cage assembly of FIG. 3.
Figure 12:
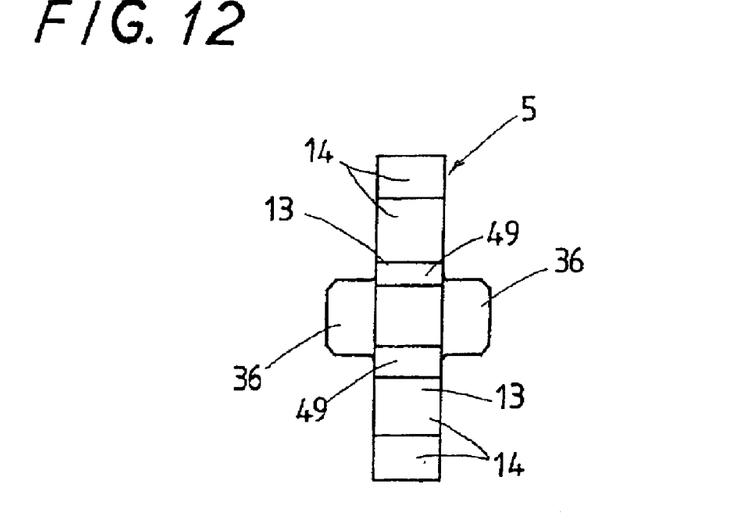
FIG. 12 is a side elevation showing the pinion of FIG. 11.

The pinion 5, as illustrated in FIGS. 11 and 12, has a disc 13 and a pinion shaft 36 extending axially from the opposite sides of the disc 13 to provide a pinion-shaft axis about which the disc 13 rotates. In detail, the pinion 5 is comprised of the disc 13 in which the teeth 14 are positioned at regular intervals around the curved periphery of the disc 13 to form slots 49 each separating any two adjacent teeth 14, and the pinion shaft 36 carried in the pinion chamber 21 for rotation to provide an axis about which the disc 13 rotates. Teeth 14 formed around the disc 13 are each made up of a dedendum part 43 extending radially outwardly out of the curved periphery of the disc 13, and an addendum part 44 integral with the dedendum part 43 and made in a semicircular profile.

The pinion 5 has a specially designed tooth profile instead of any conventional tooth profile of involute curve. For example, the pinion 5 includes the disc 13 having the radius of R2, and more than one tooth 14 having the addendum part 44 in which a top land is made in a circular profile of the radius R1. Moreover, the addendum part 44 of the tooth 14 is formed such that the center of the radius R1 is placed in the dedendum part 43 extending radially outwardly out of the curved periphery of the disc 13. The pinion 5 shown in FIG. 11 has eight teeth 14, while the pinion shaft 36 is planted integrally in the center of the disc 13 in the direction perpendicular to the plane of the discs 13. The teeth 14 constructed on the pinion 5 as stated earlier are effective to render less the resistance that will be encountered when coming in mating with the teeth 22 on the rack 4. The tooth profile of the teeth 14 stated above helps make the tooth thickness large, increasing the strength and stiffness of the teeth, and allowing the tooth to have higher dedendum of gear-tooth thereby making certain of the provision of the tooth form in which there is less possibility of disengagement out of mating with the associated tooth on the rack.

Figure 3:
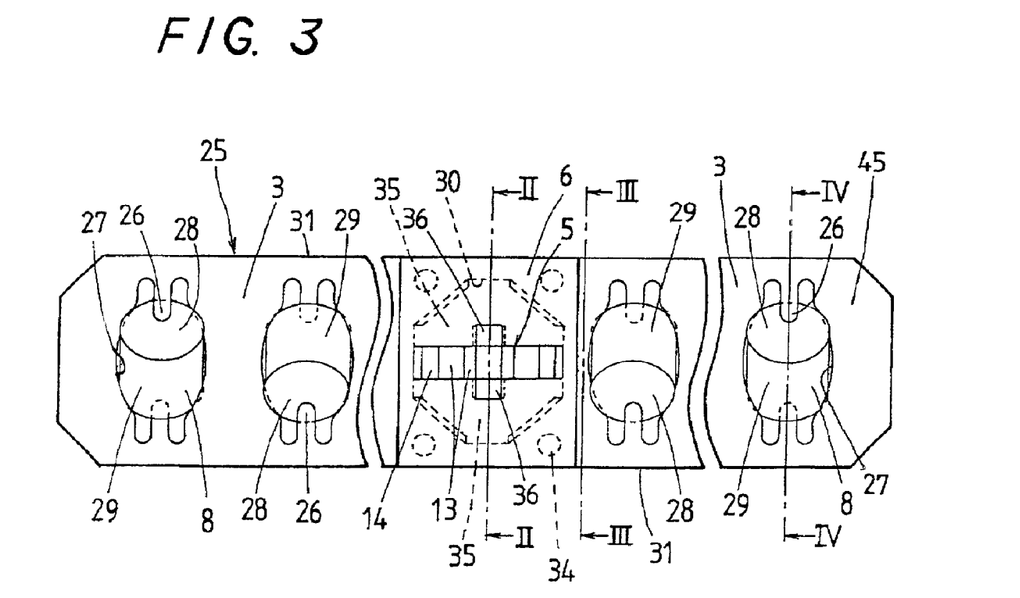
FIG. 3 is a top plan view, partly broken away, showing a cage assembly to be placed in the linear motion guide unit of FIG. 1.
Figure 4:
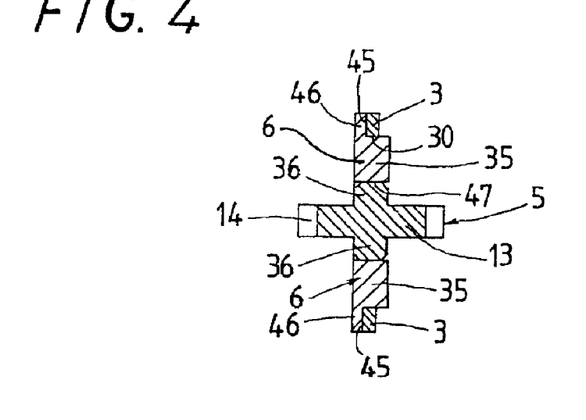
FIG. 4 is a cross section showing the cage assembly, the view being taken along the plane lying on the line II—II of FIG. 3.
Figure 5:
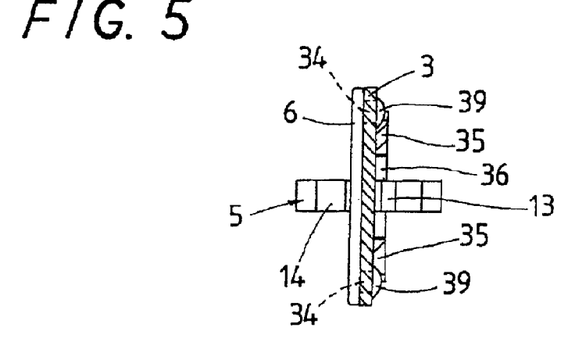
FIG. 5 is another cross section showing the cage assembly, the view being taken along the plane lying on the line III—III of FIG. 3.
Figure 6:
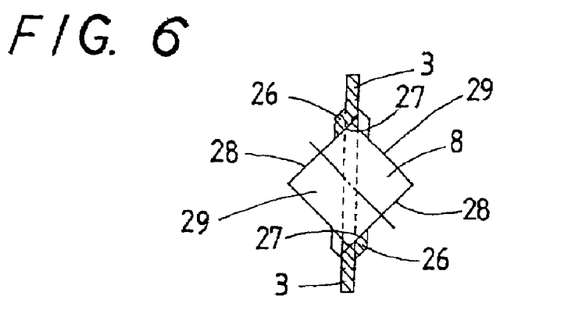
FIG. 6 is a further another cross section showing the cage assembly, the view being taken along the plane lying on the line IV—IV of FIG. 3.

Referring to FIG. 3, there is shown in detail a cage assembly 25 to be interposed between the confronting sides 15, 16 of the guide rails 1, 2. The cage assembly 25 is mainly comprised of the cage 3 to keep therein the cylindrical rollers 8 for rotation, the pinion holder 6 attached to the cage 3, and the pinion 5 installed in the pinion holder 6. As illustrated in FIGS. 3 to 5, the cage 3 is provided with the aperture 30 at the lengthwise middle thereof, in which the raised thick portion 35 of the pinion holder 6 fits closely, while the pinion holder 6 is made therein the pinion chamber 21 that includes the bearing areas 47 in which the pinion shaft 36 of the pinion 5 is carried at the opposite ends thereof for rotation, with the disc 13 of the pinion 5 being accommodated in the pinion area 33 of the pinion holder 6. Thus, the pinion 5 is installed in the cage 3 through the pinion holder 6. More than one pin 34, four pins in the illustrated embodiment, made on the flange portion 46 of the pinion holder 6 fits in a hole 32 of the cage 3 to support and locate the pinion holder 6 on the cage 3, then followed by caulking the opposite ends 39 of the pin 34 by any suitable tool to fasten firmly the pinion holder 6 on the cage 3. To keep the pinion 5 for rotation in the cage 3 through the pinion holder 6, the pinion shaft 36 of the pinion 5 is forced into the bearing areas 47 of the pinion chamber 21 in such a way the disc 13 may fit in the pinion area 33 of the pinion holder 6 secured on the cage 3.

The racks 4 lie in the gutters 9 for relief made in the raceway grooves 10 on the guide rails 1, 2, one to each gutter. With the embodiment shown in FIGS. 13 and 14, the raceway grooves 10 are each made in the V-shape in overall cross section, having two raceway surfaces 11, 12 merging together at right angle with each. Thus, the cylindrical rollers 8 retained in the cage with the fingers 26 are allowed to roll along the raceway grooves 10, with their circumferential peripheries 29 coming in rolling contact with the raceway surfaces 11, 12. The rack 4 is provided on one side thereof with a series of teeth 22 that are partially removed at their top lands to form recesses 17 so as to get out of coming in any interference with any circular edge 28 of the associated cylindrical roller 8 rolling along the raceway surfaces 11, 12, at which edge 28 a rolling periphery of the roller 8 merges together with any one of axially opposite circular ends. The recess 17 is for example made in a V-shaped slot conforming to the circular edge of the cylindrical roller 8.

Figure 19:
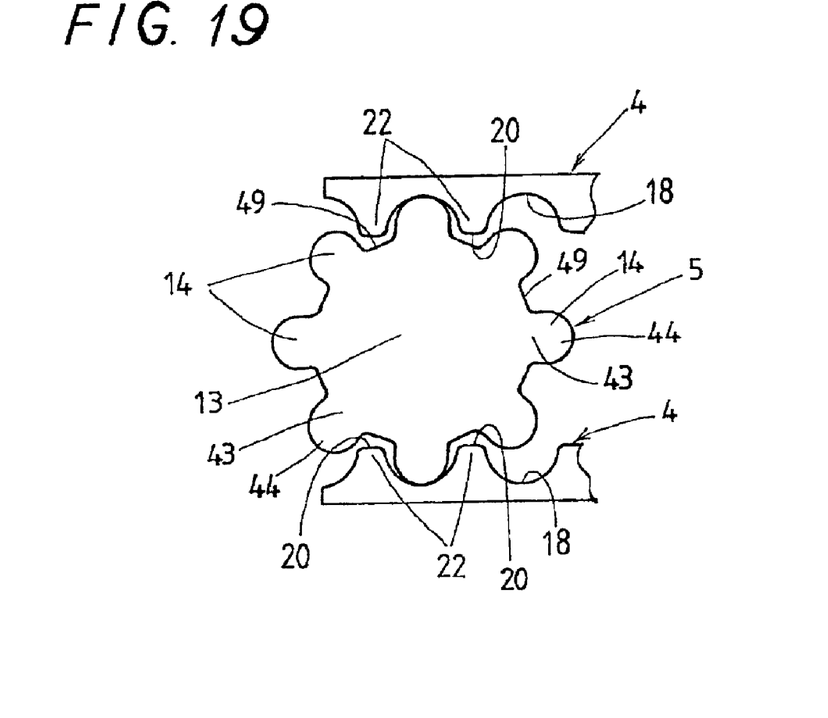
FIG. 19 is a schematic illustration explanatory of an example of mating condition of the pinion with the rack.

The rack 4, as shown in FIGS. 15 to 17, 19 and 20, is made with a series of tooth spaces 18 that are arranged in the longitudinal direction of the rack 4 at the same pitch as the circular tooth pitch of the teeth 14 around the pinion 5 to be certain of accurate mating with the pinion 5. Each tooth space 18 is defined by a bottom land 41 and lengthwise opposing tooth faces of any two adjacent teeth 22 separating two adjacent tooth spaces 18. On the top lands of the teeth 22 on the rack 4 there are made the recess 17 of V-shaped cross section lest they come in obstacle to the rolling elements 8. Moreover, the tooth space 18, as especially illustrated in FIG. 19, is designed to have a circular configuration somewhat larger in radius than the addendum 44 of the pinion tooth 14, thereby making certain of sequential mating of the pinion with the rack 4. With the rack 4 having the tooth spaces 18 mating with the teeth 14 around the pinion 5, the tooth 22 on the rack 4 separating any two adjacent tooth spaces 18 has an addendum part 19 where the top land 20 is made into a flat top somewhat higher than the radius of the circular tooth space, without terminating in any tapered tip. Moreover, the teeth 22 on the rack 4 are partially removed at their top lands to form the recesses 17 lest they come in contact with any circular edge of the cylindrical roller 8.

Figure 20:
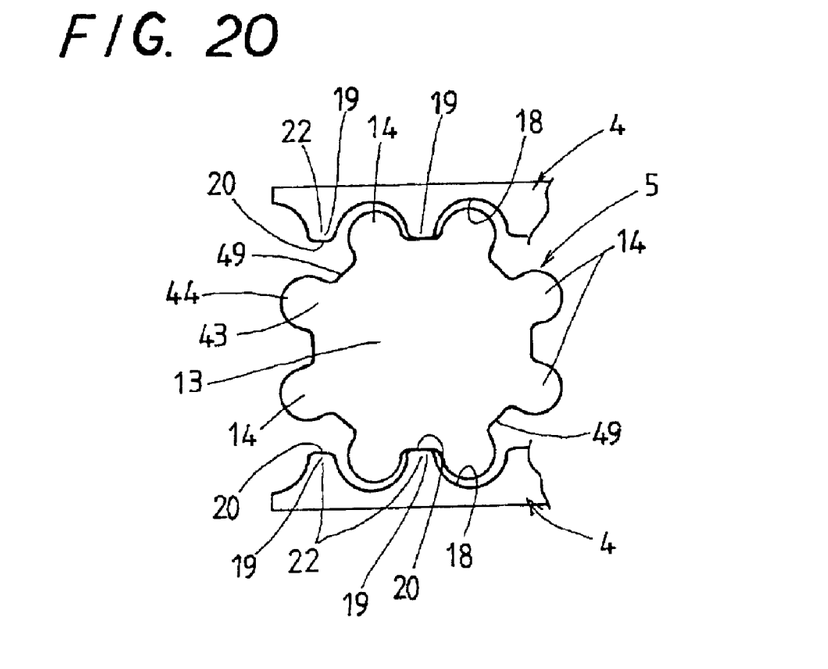
FIG. 20 is a schematic illustration explanatory of another mating condition of the pinion with the rack.

Referring to FIG. 20, there is shown another version of the rack 4 in which the tooth 22 on the rack 4 is designed to have a tooth height not less than the whole depth of the tooth around the pinion 5, making sure of coming in contact with a bottom land of the associated tooth space around the pinion 5. The mating conditions of the pinion 5 with the rack 4 illustrated in FIGS. 19 and 20 should be considered only to be the examples of the present invention and, therefore, various modifications may be made consistent with how the components are formed. The tooth profiles of the rack 4 and the pinion 5 constructed as stated earlier are effective to render less the resistance that will be encountered when the pinion 5 comes in mating with the rack 4, and further help make the tooth thickness large, increasing the strength and stiffness of the teeth to make the whole depth of tooth larger, thereby making certain of the provision of the tooth form in which there is less possibility of disengagement of the pinion 5 out of mating with the associated tooth on the rack 4.

As an alternative, the racks 4 may be prepared apart from the guide rails 1, 2, cut in a preselected length, fit in the gutters 9 for relief in the raceway grooves 10 on the guide rails 1, 2, and then secured to there with any adhesive. On a bottom surface 42 of a sole 41 of the rack 4, moreover, there may be made a center channel 37 extending, as shown in FIG. 17, lengthwise of the rack 4 to allow the adhesive, and so on to flow away through there.

Figure 15:
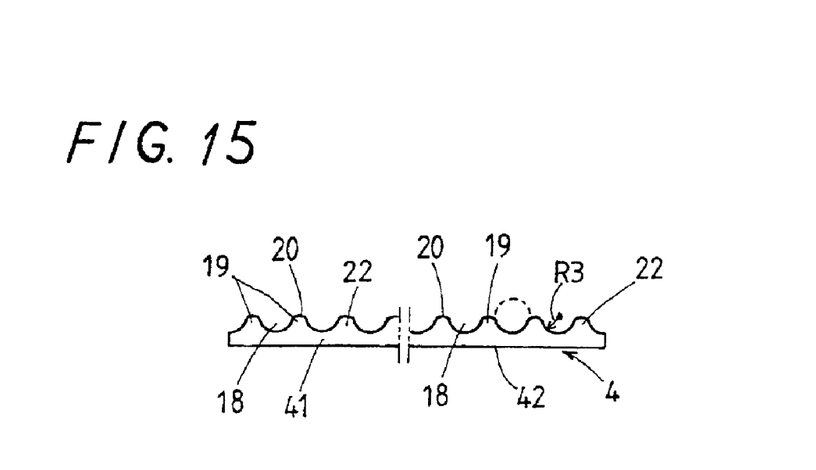
FIG. 15 is a front elevation showing a rack to be fit in the guide rail of FIG. 14.
Figure 16:
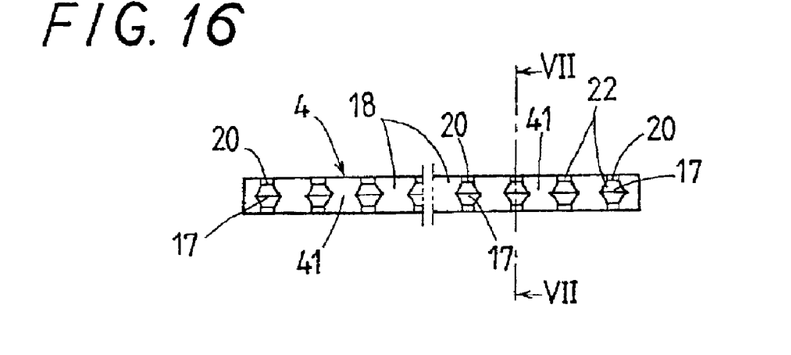
FIG. 16 is a top plan view of the rack in FIG. 15.

In contrast with the racks 4 prepared apart from the guide rails 1, 2 as stated earlier, the racks 4 can be manufactured integrally with the guide rails 1, 2 as illustrated in FIG. 18, by using any metal injection-molding and metal powder sintering. In the production process of the rack 4 integral with the associated guide rail, the metal injection-molding is first done in which for example powdery stainless steal is poured in any mould to stock rack blanks. The stocked blank is then cut at a preselected length, followed by L-forming, quenching and machining to be made in the finished rack. According to the production process stated just above, the teeth on the rack are made by the mould corresponding to the desired tooth profile, while the recesses 17 on the top lands of the teeth 22 on the rack 4 are cut with any post-machining process. This production technique of the rack has no need of making the gutters 9 for relief on the raceway grooves 10 of the guide rails 1, 2, thereby making it possible to provide the rack that is superior in stiffness, with even small in dimension, thus eventually helps realize the linear motion guide unit with rack-and-pinion combination, which is much small in construction. It is to be moreover noted that the teeth on the rack 4 having the tooth profile defined as shown in FIG. 15 are easy to be made with the metal injection-molding.

What is claimed is:

1. A linear motion guide unit with means for keeping a cage against wandering, comprising; a pair of guide rails that are arranged movable relatively to one another and have confronting raceway grooves on their lengthwise sides, one to each side, a cage lying in a raceway defined between the raceway grooves on the guide rails, with retaining therein more than one rolling element, racks lying in the raceway grooves, one to each raceway groove, in opposition to one another, and a pinion having teeth mating with the opposing racks and installed in the cage for rotation;

wherein the cage has therein an aperture in which a pinion holder fits, and the pinion is accommodated for rotation in a pinion chamber defined in a middle area inside the pinion holder, wherein the pinion comprises a disc in which the teeth are positioned circumferentially at regular intervals around the disc to form tooth spaces each separating any two adjacent teeth, and a shaft, which is made as a unit with the disc, is forced into the pinion chamber to fit for rotation in the pinion chamber to provide an axis about which the disc rotates, wherein the pinion holder has a thick portion raised above any one side thereof so as to fit in the aperture in thecage along an edge surrounding the aperture, thereby providing the pinion chamber, and a flange portion surrounding the thick portion so as to come into engagement with any flank of the cage around the aperture to join the pinion holder to the cage, and wherein the pinion chamber defined in the middle area inside the pinion holder includes a bearing area where the pinion shaft is carried for rotation after being forced to fit therein, and a pinion area where the disc of pinion is installed.

2. A linear motion guide unit with means for keeping a cage against wandering constructed as defined in claim 1, wherein the teeth formed around the disc are each made up of a dedendum part extending radially outwardly out of a curved periphery of the disc, and an addendum part integral with the dedendum part and made in a semicircular configuration.

3. A linear motion guide unit with means for keeping a cage against wandering constructed as defined in claim 1, wherein the rack lie in a gutter cut in the raceway groove in a longitudinal direction thereof.

4. A linear motion guide unit with means for keeping a cage against wandering constructed as defined in claim 1, wherein the rack is made with a series of tooth spaces that are arranged in the longitudinal direction of the rack at the same pitch as a circular tooth pitch of the teeth around the pinion, and the tooth spaces are each designed to have a circular configuration somewhat larger in radius than the semicircular configuration of the addendum of the pinion tooth, thereby making certain of sequential mating with the pinion tooth.

5. A linear motion guide unit with means for keeping a cage against wandering constructed as defined in claim 4, wherein the tooth on the rack separating any two adjacent tooth spaces to come in mating with the tooth around the pinion has an addendum part where a top land is made into a flat top somewhat higher than a radius of semicircular tooth space, without terminating in any tapered tip.

6. A linear motion guide unit with means for keeping a cage against wandering constructed as defined in claim 1, wherein the teeth on the rack are made with recesses lest they come in contact with the rolling elements arranged in the raceway grooves.

7. A linear motion guide unit with means for keeping a cage against wandering constructed as defined in claim 1, wherein the racks are prepared either apart from the guide rails having the raceway grooves in which the racks lie or integrally with the guide rails.

8. A linear motion guide unit with means for keeping a cage against wandering constructed as defined in claim 1, wherein the guide rail and the rack is made integrally of a powder of metal, which is formed with an injection molding, followed by being subjected to sintering.

9. A linear motion guide unit with means for keeping a cage against wandering constructed as defined in claim 1, wherein the raceway grooves are each made up of a pair of raceway surfaces with which the rolling elements of cylindrical roller come in rolling contact, and a gutter sunk between the raceway surfaces, in which the rack lies.

10. A linear motion guide unit with means for keeping a cage against wandering constructed as defined in claim 9, wherein the cylindrical rollers are held in the cage such that they lie in the raceway grooves with their own axes intersecting alternately one another at right angle.

11. A linear motion guide unit with means for keeping a cage against wandering constructed as defined in claim 1, wherein the guide rails are each provided with a stopper to keep the cage from escape out of the associated guide rail.

12. A linear motion guide unit with means for keeping a cage against wandering constructed as defined in claim 1, wherein the guide rails are provided with fastening means to secure any one of a moving part such as a table or the like and a stationary part such as a bed or the like.

* * * * *